United States Patent [19]

Visalli

[11] 4,231,549
[45] Nov. 4, 1980

[54] VALVE STEM AND VALVE DISC CONNECTION FOR A DIAPHRAGM VALVE

[75] Inventor: Robert G. Visalli, Murrysville, Pa.

[73] Assignee: Kerotest Manufacturing Corp., Pittsburgh, Pa.

[21] Appl. No.: 967,912

[22] Filed: Dec. 11, 1978

[51] Int. Cl.³ .......................................... F16K 31/44
[52] U.S. Cl. .............................. 251/335 A; 251/269
[58] Field of Search ............... 251/335 A, 269, 266, 251/214; 137/454.6

[56] References Cited

U.S. PATENT DOCUMENTS

| | | | |
|---|---|---|---|
| 1,316,585 | 9/1919 | Logan | 251/269 |
| 2,504,057 | 4/1950 | Trefil | 251/335 A |
| 2,638,307 | 5/1953 | Fortune | 251/335 A |
| 2,665,105 | 1/1954 | Svabek, Jr. | 251/335 A |
| 2,699,801 | 1/1955 | Schleyer | 137/553 |
| 2,702,686 | 2/1955 | Fortune | 251/335 A |
| 2,784,934 | 3/1957 | Pauluis, Jr. et al. | 251/335 A |
| 2,812,777 | 11/1957 | Dahl | 251/335 A |
| 2,856,151 | 10/1958 | Peters | 251/330 |
| 2,880,620 | 4/1959 | Bredtschneider | 251/335 B |
| 2,983,480 | 5/1961 | Greenlie | 251/335 R |
| 3,257,095 | 6/1966 | Siver | 251/330 |
| 3,826,465 | 7/1974 | Whittaker et al. | 251/335 B |
| 3,838,707 | 11/1974 | Wachowitz, Jr. | 251/335 A X |
| 3,874,636 | 4/1975 | Bake et al. | 251/335 A |
| 3,979,105 | 9/1976 | Pool et al. | 251/335 A |
| 3,982,729 | 9/1976 | Trieini | 251/335 A |

FOREIGN PATENT DOCUMENTS

| | | | |
|---|---|---|---|
| 650693 | 10/1962 | Canada | 251/335 A |
| 1285294 | 1/1962 | France | 251/269 |
| 450564 | 2/1949 | Italy | 251/269 |
| 740707 | 10/1955 | United Kingdom | 251/335 A |
| 1181374 | 2/1970 | United Kingdom | |

Primary Examiner—Martin P. Schwadron
Assistant Examiner—A. Michael Chambers
Attorney, Agent, or Firm—Stanley J. Price, Jr.; John M. Adams

[57] ABSTRACT

A valve body has a valve seat in the lower portion of a valve chamber with inlet and outlet openings communicating with the chamber for the flow of fluid therethrough. A valve assembly has a valve disc arranged to move into and out of abutting relation with the valve seat and a disc cap connected to the upper portion of the valve disc. A valve stem supported for axial, reciprocal movement within the valve chamber has a threaded upper portion connected to a rotatable bushing and a threaded lower portion connected to the disc cap. A flexible metal diaphragm assembly separates the valve chamber into the upper and lower portions and includes an axial bore through which the lower portion of the valve stem extends. A diaphragm stem clamp threadedly engaged to the valve stem lower portion securely abuts the top surface of the diaphragm. The disc cap is threadedly engaged to the lower portion of the valve stem on the opposite side of the diaphragm assembly and securely abuts the bottom surface thereof to provide a fluid tight seal between the diaphragm assembly and the valve stem where the valve stem extends through the diaphragm assembly. Downward and upward movement of the valve stem moves the valve disc into and out of abutting relation with the valve seat to assure positive opening and closing of the valve.

10 Claims, 3 Drawing Figures

VALVE STEM AND VALVE DISC CONNECTION FOR A DIAPHRAGM VALVE

BACKGROUND OF THE INVENTION

1. Field of the Invention

This invention relates to a diaphragm-type valve and more particularly to a flexible metal diaphragm-type valve having a valve stem that extends through the flexible metal diaphragm and is rigidly connected to the valve disc assembly.

2. Description of the Prior Art

Diaphragm-type valves as disclosed in U.S. Pat. Nos. 2,983,480 and 2,812,777 include a valve stem arranged for reciprocal movement within the chamber of a valve body. The valve stem has a lower end portion abutting the top surface of a diaphragm assembly. Axial movement of the valve stem is transmitted through the diaphragm which seals the lower portion of the valve chamber from the upper portion of the valve chamber. A valve member is reciprocally positioned in the chamber in overlying relation with the valve seat to move between a position spaced from the valve seat and a position abutting the valve seat. A cap of the valve member abuts the bottom surface of the diaphragm.

A spring, as disclosed in U.S. Pat. No. 3,982,729, is positioned around the valve member and abuts at one end a cup shaped member movably positioned within the lower portion of the valve chamber and at the other end to the upper portion of the valve member. With this arrangement the spring urges the valve member toward an open position. Downward movement of the valve stem is transmitted through the diaphragm assembly to the upper portion of the valve member. The force transmitted through the diaphragm to the valve member overcomes the force of the return spring to urge the valve member into abutting and sealing relation with the valve seat to close the valve.

For valves of the above type which are utilized to control the flow of contaminated fluids as encountered in nuclear power plants and the like, it is of prime importance that the valve be operable to maintain the valve member in a preselected position, i.e., opened or closed or in a position therebetween. A problem of a valve malfunction occurs as a result of throttling of the line fluid resulting in the valve member bouncing or rotating causing damage to the valve member. Damage of the valve member also occurs for a valve having a large number of internal parts due to vibration imparted to the valve parts. For example, vibration of the return spring can result in damage to the valve member. If the vibration becomes excessive, the effectiveness of the valve to seal the inlet from the outlet is substantially impaired.

Other difficulties encountered with conventional diaphragm-type valves include the inoperability of valves to operate bidirectional, i.e. to control the fluid flow in both directions through the valve. This is particularly the case with a normally unidirectionally operated valve which is inoperable to effect valve opening during backflow. With many valves utilizing an automatic operator to control fluid flow it is difficult to provide the required thrust to (1) maintain the valve disc on the valve seat without leakage and (2) overcome the pressure across the valve seat to effect valve closure. Also, there are occasions in the operation of a unidirectionally operated valve to cause a differential pressure across the valve seat thereby requiring that the valve disc be moved from the valve seat with high pressure over the valve seat. Spring biased diaphragm-type valves are unsuitable for this operation. Furthermore, spring biased diaphragm valves are not satisfactory for use in petro-chemical plants to control the flow of highly viscose fluids or slurries because of the increased surface areas provided in the valve for the collection of foreign matter which interferes with the operation of the valve. In addition spring biased diaphragm valves are inefficient to maintain the valve disc locked in an intermediate position.

Valve assemblies as disclosed by U.S. Pat. Nos. 2,856,151; 2,880,620; 3,257,095; 3,826,465 and British Pat. No. 1,181,374 provide for direct connection of the valve member to the valve stem. With this arrangement movement of the valve stem raises and lowers the valve member to open and close the valve. Standard gate valves also utilize a direct connection of the valve member to the valve stem.

U.S. Pat. No. 2,638,307 discloses a diaphragm valve having a valve stem threaded into engagement with the internal threaded bore of a ram that is slidable within the valve chamber. The lower end of the ram includes an axial bore through which a screw extends and passes through a bushing of a flexible elastomer diaphragm into threaded engagement with the valve member. With this arrangement the valve member and the ram are connected. The ram and valve member have opposing faces which abut the upper and lower surfaces of the diaphragm. Rotation of the valve stem through a handwheel urges the ram to move downwardly within the valve housing. Downward movement of the ram is transmitted by the screw to the valve member, so that the valve member is moved into engagement with the valve seat to close the valve.

U.S. Pat. Nos. 2,699,801 and 3,838,707 also disclose elastomer diaphragm valves in which the valve stem extends through an aperture of the diaphragm. An elastomer diaphragm is subject to rupture if flexed beyond its elastic limits. Consequently the upper and lower surfaces must be supported to prevent flexing of the diaphragm beyond its elastic limit. As disclosed for the above elastomer diaphragm valves, members such as flanges, cups, discs and the like clamp the diaphragm and support its opposite surfaces to prevent rupture of the diaphragm. These elements add substantial complexity to the internal valve construction.

There is need for a flexible metal diaphragm-type valve having a stable internal construction that is resistant to vibration in order to prevent malfunction of the valve without undue complexity to assure valve operability. Further, there is need for a diaphragm valve operable bidirectionally and capable of precisely controlling fluid flow in an intermediate position between the opened and closed position.

SUMMARY OF THE INVENTION

In accordance with the present invention, there is provided a diaphragm valve that includes a valve body having a chamber therein with an upper portion and a lower portion. The lower portion has inlet and outlet openings communicating with the chamber lower portion. A valve seat is provided in the chamber lower portion between the inlet and outlet openings. A valve assembly is positioned in the chamber lower portion in overlying relation with the valve seat and is arranged to control the flow of fluid through the chamber lower portion. A flexible diaphragm assembly is positioned in the chamber in overlying abutting relation with the valve assembly. The diaphragm assembly is arranged to seal the chamber lower portion from the chamber upper portion. The diaphragm assembly has an axial bore extending therethrough. The axial bore forms an inner annular edge portion surrounding the axial bore. A bonnet is positioned in the chamber upper portion in overlying relation with the diaphragm assembly. The bonnet has a passageway therethrough, and the passageway is aligned with the diaphragm axial bore. A valve stem extends through the bonnet passageway and is positioned within the bonnet passageway for nonrotational longitudinal movement relative thereto. The valve stem has an upper portion extending above the bonnet and a lower portion extending through the bonnet and through the diaphragm axial bore. The valve stem lower portion is connected to the valve assembly. A retainer device is axially mounted on and secured to the valve stem upper portion and is operable to move the valve stem axially relative to the bonnet so that the valve assembly moves positively into and out of sealing relation with the valve seat. The diaphragm assembly is maintained in sealing engagement with the valve stem where the valve stem extends through the diaphragm assembly allowing movement of the valve stem and the valve assembly.

The retainer device is nonrotatably connected to a bushing that is axially fixed in the chamber upper portion. The bushing is rotatably connected to the portion of the valve stem upper portion that extends above the valve body so that upon rotation of the retainer, the bushing rotates to axially move the valve stem in the bonnet passageway. Means is also provided to prevent rotation of the valve stem as it moves axially. The bushing is rotatably supported in the upper portion of the bonnet and is restrained by the bonnet from moving axially in the chamber upper portion when the retainer is rotated in a preselected direction to move the valve member either into or out of engagement with the valve seat. With this arrangement, upon rotation of the retainer device the valve stem is operable to move reciprocally in the bonnet passageway without rotating.

The lower portion of the valve stem extends through the axial bore of the diaphragm assembly. The diaphragm assembly has an outer peripheral edge portion that is compressed between the lower annular edge portion of the bonnet and an annular shoulder of the valve body to thereby position the diaphragm in surrounding relation with the lower portion of the valve stem spaced from a radially extending shoulder that separates the upper and lower portions of the valve stem. A diaphragm stem clamp is axially secured to the lower portion of the valve stem between the shoulder and the diaphragm assembly.

The diaphragm stem clamp has a lower convex shaped surface positioned in overlying abutting relation with the upper surface of the diaphragm assembly. The stem clamp has an axial bore aligned with the diaphragm assembly axial bore. A flat, annular clamping seal edge is provided on the lower convex shaped surface surrounding the stem clamp axial bore. A locking device threadedly engaged to the valve stem above the stem clamp applies a downward axial force upon the stem clamp to urge the seal edge into abutting relation with upper surface of the diaphragm assembly surrounding the axial bore thereof. The seal edge serves to support the inner annular edge portion of the diaphragm assembly in surrounding relation with the valve stem to thereby sealingly connect the diaphragm assembly to the valve stem. With this arrangement as the valve stem reciprocates in the bonnet, the portion of the diaphragm assembly surrounding the valve stem moves with the valve stem; however, an effective fluid tight seal is maintained around the valve stem.

The valve assembly includes a disc cap and a valve disc. The disc cap has a first axial bore at one end portion for threadedly receiving the lower portion of the valve stem and a second axial bore at the opposite end portion for receiving the valve disc. The disc cap has an upper convex shaped surface positioned in underlying abutting relation with the lower surface of the diaphragm assembly. With this arrangement oppositely positioned convex surfaces are urged into compressing relation with the diaphragm assembly to maintain the diaphragm assembly sealingly connected to the valve stem.

The valve disc of the valve assembly is positioned in the chamber lower portion and has a lower convex shaped surface positioned in overlying relation with the valve seat and an upper end portion. The upper end portion is threadedly engaged within the axial bore of the disc cap. With this arrangement the valve disc is connected to the disc cap for reciprocal movement within the chamber lower portion. By rotation of the retaining mechanism, the valve stem is advanced downwardly in the bonnet passageway to downwardly move the disc cap and advance the valve disc into abutting and sealing relation with the valve seat.

Accordingly, the principal object of the present invention is to provide a diaphragm-type valve having a valve stem that extends through the diaphragm and is directly connected to the valve disc assembly to thereby provide for positive opening and closing of the valve and permit the valve to operate bidirectional, i.e. control the flow in both directions through the valve.

Another object of the present invention, is to provide a diaphragm valve with a valve stem directly connected to the valve disc assembly to enhance the stability of the valve construction by making the internal parts rigid and by reducing the number of internal parts subject to vibration to eliminate bouncing or rotation of the valve disc due to throttling of the line fluid.

A further object of the present invention is to provide a diaphragm-type valve having a reduced number of internal parts by directly connecting the valve stem to the valve disc assembly and extending the stem through the diaphragm to thereby eliminate the need for a return spring and the internal surface and areas within the valve where foreign matter may collect and inhibit the performance of the valve.

Another object of the present invention is to provide for Y-type globe valves, gate valves, ball valves and the like a solid connection between the valve stem and the valve disc that engages the valve seat where the valve stem extends through and is sealingly engaged to a flexible diaphragm assembly.

An additional object of the present invention is to provide a diaphragm-type valve operable with an automatic operator mechanism to control movement of the valve disc assembly with reduced thrust requirements, particularly when the valve is used in "flow over the seat-type" arrangements.

Another object of the present invention is to provide a diaphragm-type valve operable to positively move the valve disc from the seat and open the valve with substantial flow pressure exerted on the valve disc and over the valve seat.

Another object of the present invention is to provide a diaphragm-type valve operable to control the flow of highly viscose fluids and slurries where the position of the valve disc assembly relative to the valve seat is precisely controlled.

These and other objects of the present invention will be more completely described and disclosed in the following specification, the accompanying drawings and the appended claims.

DESCRIPTION OF THE PREFERRED EMBODIMENT

Figure 1:
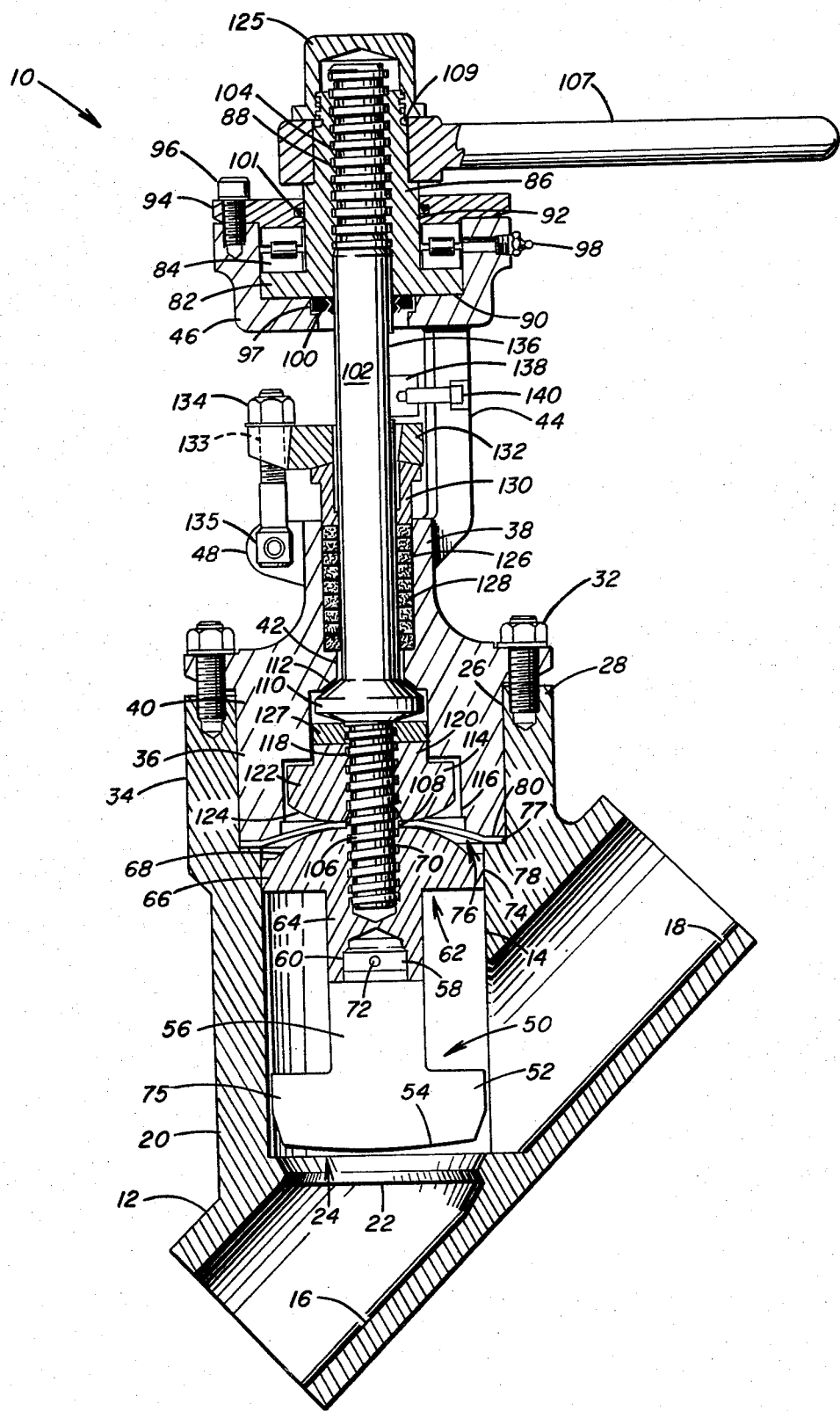
FIG. 1 is a developed view in side elevation and partially in section of the diaphragm valve of the present invention in an open position, illustrating the valve stem extending through the diaphragm assembly and directly connected to the valve disc assembly.

Referring to the drawings, there is illustrated a diaphragm valve generally designated by the numeral 10, having a Y-shaped body portion 12, with an elongated chamber 14 therein. Inlet and outlet openings 16 and 18 communicate with the chamber 14 for the flow of fluid therethrough. The body portion 12 has a base portion 20 with an annular valve seat 22. A valve assembly generally designated by the numeral 24 is positioned in overlying relation with the valve seat 22 and is arranged to move into and out of abutting and sealing relation with the valve seat 22 to control the flow of fluid between the openings 16 and 18. The chamber 14 has an upper open end portion 26 with an annular shoulder portion 28 therearound.

The valve body portion 12 has an upper portion 34 in which a bonnet 36 is axially aligned. The bonnet 36 includes upper and lower annular ring portions 38 and 40 which form a passageway 42 therethrough. Bonnet support arms 44 (only one of which is shown in FIG. 1) extend upwardly from the upper annular ring portion 38 and are connected to a bushing retainer 46. Additionally support arms 48 (only one of which is shown in FIG. 1) extend outwardly from the upper annular ring portion 38. The lower annular ring portion 40 is positioned on shoulder portion 28, and bolts 32 are threadedly advanced into aligned bores of ring portion 40 and shoulder 28 to secure the bonnet 36 to the valve body upper portion 34.

The valve assembly 24 includes a valve disc generally designated by the numeral 50 having an enlarged lower end portion 52. The end portion 52 includes a convex surface 54 that is arranged upon closing of the valve to abut and sealingly engage the valve seat 22. The valve disc 50 also includes a cylindrical portion 56 that extends axially upwardly from the lower end portion 52. A threaded stub shaft 58 extends axially from the end portion of the cylindrical portion 56. The stub shaft 58 is arranged to threadedly engage an axial bore 60 of a disc cap generally designated by the numeral 62 of the valve assembly 24. The disc cap 62 includes a cylindrical portion 64 axially aligned with an upper portion 66 having a convex surface 68. An axial threaded bore 70 extends through the convex surface 68 into the upper portion 66 and is aligned with the axial bore 60.

The valve disc is rigidly connected to the disc cap 62 by the threaded connection of the stub shaft 58 within the axial bore 60. Also, the disc cap and valve disc remain rigidly connected by a pin 72 that extends through aligned horizontal bores of the disc cap cylindrical portion 64 and the stub shaft 58. The pin 72 prevents rotation of the valve disc 50 relative to the disc cap 62. The disc cap 62 and valve disc 50 also have outer annular edge portions 74 and 75 that are slidable on the wall of chamber 14. This arrangement serves to maintain axial alignment of the disc cap 62 and the valve disc 50 in the chamber 14 as the valve assembly 24 is reciprocated within the lower portion of the chamber 14.

The convex surface 68 of the disc cap 62 is arranged to abut a flexible metal diaphragm assembly generally designated by the numeral 76. The diaphragm assembly is not shown in section in the drawings so that it may be more clearly illustrated. The diaphragm assembly 76 has a generally circular disc-like configuration with an outer annular edge 77 that abuts top annular edge 78 of the body portion 12. A lower annular edge 80 of bonnet 36 abuts the top of the outer annular edge of the diaphragm assembly 76. Thus the diaphragm assembly 76 provides a fluid tight seal within the bonnet passageway 42 and the chamber open end portion 26 between the bonnet 36 and the chamber 14. The diaphragm assembly 76 is preferably fabricated of flexible metal and may include a plurality of individual diaphragms positioned in overlying relation to form a composite diaphragm assembly having a preselected thickness.

A bushing 82 is received within the bushing retainer 46 of the bonnet 36 and is rotatably supported therein by bearing assembly 84. The bushing 82 includes an elongaged cylindrical body portion 86 and has a threaded axial passageway 88 therethrough and a lower flanged end portion 90. The outer cylindrical surface of bushing 82 is positioned in slidable abutting relation with the body portion of the bonnet bushing retainer 46 and bushing body portion 86 is positioned within an axial passageway 92 of bonnet cover 94 which is secured to the upper annular shoulder of bushing retainer 46 by cap screws 96. The bushing retainer 46 has an axial bore 97 aligned with the threaded axial passageway 88 of bushing 82. The bushing retainer 46 includes a lubricating fitting 98 for supplying the bearing assembly 84 with lubricant. A suitable seal 100 is positioned in bore 97 of bushing retainer 46. An O-ring seal 101 surrounds bushing body portion 86 and is supported in sealing relation therewith by bonnet cover 94.

A valve stem 102 extends into the valve chamber 14 and has a threaded upper portion 104 suitably secured in the threaded axial passageway 88 of bushing 82 and a threaded lower portion 106 that extends through an axial bore 108 of diaphragm assembly 76. The threads of the valve stem upper portion 104 and lower portion 106 are diagrammatically illustrated in the drawings. The stem lower portion 106 is secured in the threaded axial bore 70 of the disc cap 62. A shoulder 110 extends radially outwardly from the body of valve stem 102 between the upper portion 104 and the lower portion 106. The upper portion of shoulder 110 is positioned within the bonnet passageway 42 below an inturned annular shoulder 112 of the bonnet 36. When the valve is in an open position the shoulder 110 abuts the inturned annular shoulder 112 and is restrained from further upward movement in the bonnet 36. Further, with this arrangement the shoulder 112 maintains axial alignment of the valve stem lower portion 106 within the lower portion of the valve chamber 14 as the valve stem 102 moves reciprocally within the valve chamber 14.

The bushing 82 is nonrotatably connected to the valve stem upper threaded portion 104 and is rotatable relative to the bonnet bushing retainer 46. The valve stem upper threaded portion 104 extends upwardly through the bushing passageway 88. A retainer or handwheel 107 is nonrotatably connected to the bushing body portion 86. An O-ring seal 109 is positioned between body portion 86 and the internal cylindrical wall of retainer 107. A lock nut 125 is threaded onto the upper portion of the bushing 82 and abuts the retainer 107 to thereby maintain the retainer 107 in place on the bushing. With this arrangement, rotation of the retainer 107 is transmitted to the bushing 86 to rotate the bushing in the bushing retainer 46. The bushing 82 is axially fixed within the bushing retainer 46 so that as the bushing 82 rotates in a preselected direction the valve stem 102 moves longitudinally in the bonnet passageway 42, either upwardly or downwardly to open or close the valve. However, the valve stem 102 moves axially without rotating upon rotation of retainer 107 and bushing 82.

Further, to prevent rotation of the valve stem 102 as it advances axially within the bonnet passageway 42, the valve stem upper portion 104 is provided with a longitudinal slot 136 in which is positioned a key 138. The key 138 is movable longitudinally upwardly and downwardly in the slot 136 but is restrained by the lateral edges of the slot to move laterally in the slot. A lock screw 140 extends through a bore in the bonnet support arms 44 and into engagement with the key 138. Thus with this arrangement the valve stem 102 is restrained from rotating in the bonnet passageway 42 but is permitted to move longitudinally therein within the limits provided by the longitudinal movement of key 138 in slot 136. The length of the slot 136 is sufficient to permit movement of the valve disc 50 between the extreme open and closed positions.

A diaphragm stem clamp 114 is axially positioned within an expanded axial passageway 116 at the lower end of the bonnet 36. The stem clamp 114 has an axial bore 118 extending through a reduced upper end portion 120 and an enlarged lower end portion 122 having a generally convex surface 124. The reduced upper end portion 120 of stem clamp 114 is spaced from the shoulder 110 by a stem lock nut 127 that is threadedly secured to the valve stem lower portion 106 in abutting relation with the clamp reduced upper end portion 120. The stem clamp 114 is secured on the valve stem lower end portion 106 to maintain the convex surface 124 in abutting and overlying relation with the diaphragm assembly 76 opposite the convex surface 68 of the disc cap upper portion 66. The flexible metal diaphragm assembly 76 thus is engaged by the convex surfaces 68 and 124 to maintain a fluid tight seal between the inner annular edge portion of the diaphragm assembly 76 formed by bore 108 and the threaded lower portion 106 of valve stem 102. Also in accordance with the present invention a fluid tight seal between the diaphragm assembly 76 and the valve stem 102 can be effected by electron beam welding the inner annular edge portion of the diaphragm assembly to the valve stem threaded lower portion 106. This arrangement also ensures a positive connection of the diaphragm assembly 76 to the valve stem 102.

An annular recessed portion 126 is formed in the bonnet passageway above the inturned annular shoulder 112 and the stem shoulder 110. Suitable packing material such as a wire reinforced packing ring 128 is positioned within the recessed portion 126. The packing ring 128 surrounds the valve stem 102 and permits reciprocating movement of the valve stem 102 within the bonnet passageway 42. The packing ring 128 may include a plurality of individual packing rings positioned in overlying relation in the recessed portion 126 between the bonnet upper annular ring portion 38 and the valve stem 102. A metallic circular follower member 130 is positioned in abutting relationship with the top surface of the packing ring 128. An elliptically shaped follower plate 132 is positioned in overlying relation with the follower member 130 and surrounds the valve stem 102. The follower plate 132 is arranged to bear upon the follower member 130. The follower plate 132 is positioned adjacent to in spaced overlying relation with the bonnet support arms 48.

The follower plate 132 has a pair of internally threaded bores 133 (only one of which is shown in the developed view in FIG. 1) positioned in overlying relation with corresponding pairs of bores 135 of the bonnet support arms 48. Suitable fastening means such as bolts 134 are threadedly advanced through bores 133 and are suitably secured to the bonnet support arms 48 in the bores 135. With this arrangement the bolts 134 connect the follower plate 132 to the bonnet support arms 48 and thereby apply compressive forces through the follower plate 132 and the follower member 130 to the packing ring 128.

As disclosed in U.S. Pat. No. 3,982,729 by applying compressive forces to the packing ring 128, a fluid and pressure tight seal is provided between the outer sealing surface of the valve stem 102 and the inner sealing surface of the bonnet 36 in the annular recessed portion 126. Accordingly, the bolts 134 may be adjusted externally of the valve body 12 to apply preselected levels of compressive forces to the packing ring 128 to maintain a fluid and pressure tight seal within the bonnet passageway 42. In addition the lower annular ring member 38 of bonnet 36 transmits compressive forces downwardly through the bonnet 36 to maintain the lower annular edge 80 in abutting contact with the top surface of the outer annular edge portion of the flexible metal diaphragm assembly 76. This provides a fluid tight seal within the bonnet passageway 42 between the bonnet 36 and the valve chamber 14.

Figures 2, 3:
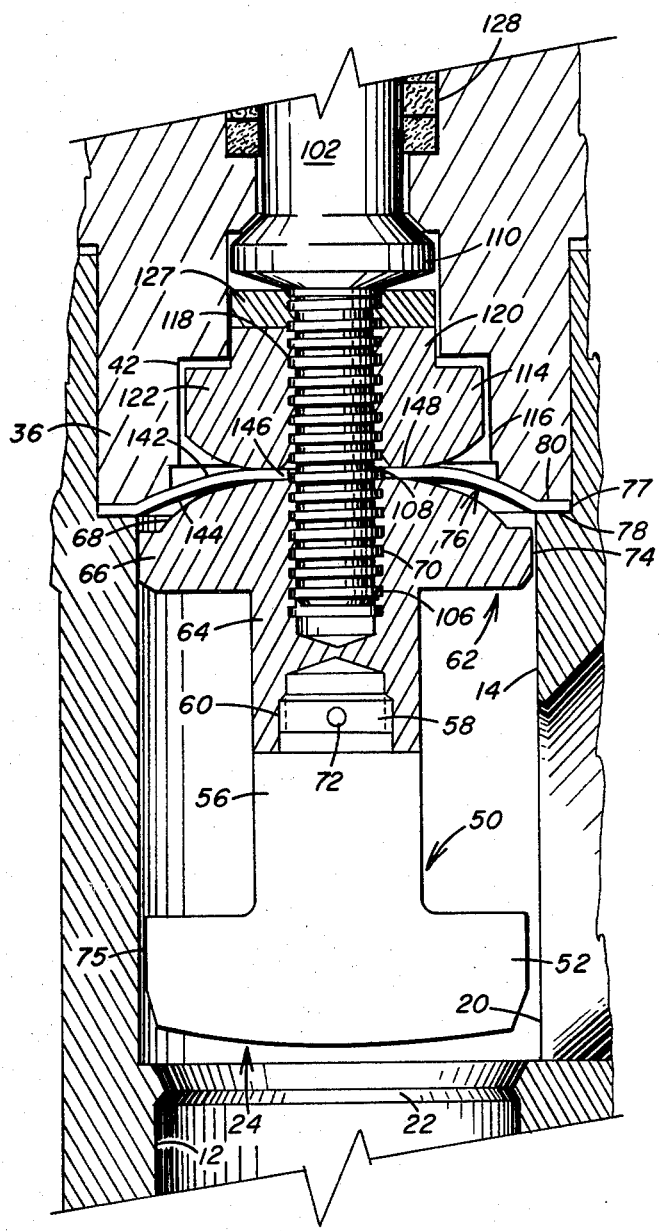
FIG. 2 is a fragmentary view in side elevation of the diaphragm valve, illustrating the rigid connection of the stem clamp with the disc cap of the valve disc assembly.
FIG. 3 is a fragmentary perspective view, partially in section, of the stem clamp, illustrating a flat annular seal edge on the lower convex shaped surface of the stem clamp.

Referring to FIG. 2 there is illustrated in greater detail the direct connection of the valve stem lower portion 106 with the valve assembly 124 and also the engagement of the stem clamp 114 and disc cap 62 with the diaphragm assembly 76. The diaphragm assembly 76 includes an upper surface 142 and a lower surface 144. The bore 108 extending through the center of the diaphragm assembly 76 forms an inner annular edge portion 146. The edge portion 146 is arranged to sealingly engage the surface of the valve stem lower portion 106 that extends through the bore 108 so as to prevent leakage between the valve stem and the diaphragm inner annular edge.

As above described outer annular edge 77 of diaphragm assembly 76 is secured between the bonnet annular edge 80 and the valve body annular edge 78.

With this arrangement the diaphragm assembly 76 is operable to pivot about its connection to the bonnet and valve body. Thus, upon movement of the valve stem 102, the diaphragm outer annular edge 77 remains stationary and the diaphragm inner annular edge 146 moves with the valve stem.

A fluid tight seal of the diaphragm assembly 76 with the valve stem portion 106 is maintained by the clamping engagement of the stem clamp convex surface 124 and the disc cap convex surface 68 with the upper and lower surfaces 142 and 144 of diaphragm assembly 76. In this manner the diaphragm inner annular edge 146 remains sealingly engaged to the valve stem so that the edge 146 does not separate from the valve stem and permit fluid leakage therebetween. The clamping engagement is provided by the force applied by the stem lock nut 127 upon the stem clamp 114 and the rigid engagement of the valve stem lower portion 106 with the disc cap 62. Thus, the clamping force applied by stem lock nut 127 is transmitted through the stem clamp 114 and diaphragm assembly 76 to disc cap 62.

The stem clamp 114 is provided with an annular clamping sealing surface 148 on the convex surface 124 surrounding axial bore 118. As illustrated in greater detail in FIG. 3, the sealing surface 148 is defined by an inner annular edge 150 adjacent the bore 118 and an outer annular edge 152 spaced radially from annular edge 150 to form an annular flat surface of a preselected width on the stem clamp convex surface 124.

The flat sealing surface 148 is securely maintained in contact with the upper surface 142 of diaphragm assembly 76, as illustrated in FIG. 2.

By providing the sealing surface 148 with a preselected width, the load concentrated at the diaphragm inner annular edge 146 is substantially increased. In this manner the sealing ability of the diaphragm assembly is substantially increased. In addition separation of the diaphragm assembly 76 from around the valve stem portion 106 is prevented to maintain a fluid tight seal around the valve stem where it passes through the diaphragm assembly. This seal is maintained at all times and particularly during movement of the valve stem 102. Furthermore, center clamping of the diaphragm assembly 76, as above described, assures consistent deformation of the diaphragm assembly when the valve stem moves to further extend the cycle life of a diaphragm assembly 76.

In operation upon closure of the valve by rotation of retainer 107 to, in turn, rotate the bushing 82, the valve stem 102 moves downwardly within the bonnet passageway 42. The downward movement of the valve stem 102 is guided so as to insure positive engagement of the convex surface 54 with the valve seat 22 to close the valve. The bushing retainer 46 maintains the valve stem upper portion 104 aligned with the longitudinal axis the valve chamber 14. The upper portion of valve stem 102 is also axially positioned within the bonnet 36 by the abutting relation of the inturned annular shoulder 112 with the valve stem 102. Accordingly, the lower portion 106 of the valve stem 102 is maintained axially within the bonnet 36 by movement of the shoulder 110 in the bonnet passageway 42. As illustrated in FIG. 1, when the valve is open the upper portion of shoulder 110 abuts the inturned annular shoulder portion 112. As the valve stem 102 moves downwardly, shoulder 110 moves away from the shoulder 112 and the body of the bonnet 36 forming the passageway 42 guides the downward movement of shoulder 110.

To insure positive seating of the valve disc 50 with the valve seat 22, the sliding movement of the walls of the disc cap 62 and valve disc 50 with the body of the valve maintains axial alignment of the entire valve assembly in the chamber 14. By connecting the valve assembly 24 to the valve stem 102 the valve disc 50 moves through the same longitudinal displacement of the valve stem 102. This provides precise control of the movement of the valve disc so that movement of the valve stem 102 results in corresponding movement of the valve disc. Also, by directly connecting the valve stem 102 to the valve assembly 24 a substantial number of internal parts which otherwise would be required if the valve assembly was not connected to the valve stem are eliminated. For example, with the present invention the conventional return spring for the valve disc is eliminated. Increasing the stability of the valve by the rigid connection of the valve stem 102 with the disc cap 62 and reducing the number of internal parts serves to reduce the vibration imparted to the valve parts. In this manner, malfunction of the valve caused by bouncing or rotation of the entire valve assembly 24 is prevented.

Not only is a more stable valve provided by the features of the present invention, but by reducing the number of internal parts of the valve, the number of surfaces and crevices where foreign matter normally builds up is reduced. This results in improved valve performance. Along with the advantages of reducing the number of internal parts of the valve and stabilizing the valve structure, the valve of the present invention is less resistant to the throttling forces of the line fluid. Throttling of the line fluid in conventional valves generates bouncing or rotation of valve disc assembly and resultant instability and malfunction of the valve. By rigidly connecting the disc cap to the valve stem, the valve when partially or fully open is stable thus resisting the throttling forces of the line fluid which tend to cause valve instability.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A diaphragm valve comprising,
   a valve body having a chamber therein with an upper portion and a lower portion,
   said lower portion having inlet and outlet openings communicating with said chamber lower portion,
   a valve seat in said chamber lower portion between said inlet and outlet openings,
   a valve assembly positioned in said chamber lower portion in overlying relation with said valve seat and arranged to control the flow of fluid through said chamber lower portion,
   a flexible metal diaphragm assembly positioned in said chamber in overlying abutting relation with said valve assembly,
   said metal diaphragm assembly arranged to seal said chamber lower portion from said chamber upper portion,
   said metal diaphragm assembly having an outer annular edge portion supported by said valve body,
   said metal diaphragm assembly having an axial bore extending therethrough, said axial bore forming an inner annular edge portion surrounding said axial bore, a bonnet positioned in said chamber upper portion in overlying abutting relation with said metal diaphragm assembly outer annular edge portion to thereby secure said metal diaphragm assembly to said valve body and said bonnet, said bonnet having a passageway therethrough, said passageway being aligned with said metal diaphragm assembly axial bore, a threaded stem extending through said bonnet passageway and positioned within said bonnet passageway for nonrotational longitudinal movement relative thereto, said valve stem having an upper portion extending above said bonnet and a lower portion extending through said bonney passageway and through said metal diaphragm assembly axial bore, said metal diaphragm assembly inner annular edge portion being sealingly engaged with said valve stem lower portion, said metal diaphragm assembly having a body portion extending outwardly from said inner annular edge portion to said outer annular edge portion, said body portion having substantially unsupported upper and lower surfaces thereby permitting said body portion to pivot freely about the connection of said metal diaphragm assembly to said valve body and said bonnet while maintaining said metal diaphragm assembly inner annular edge portion sealingly engaged with said valve stem lower portion, said valve stem lower portion being connected to said valve assembly, actuator means axially mounted on and secured to said valve stem upper portion for moving said valve stem axially relative to said bonnet so that said valve assembly moves positively into and out of sealing relation with said valve seat, a diaphragm stem clamp positioned on said valve stem lower portion to engage one side of said metal diaphragm assembly inner annular edge portion and form a fluid tight seal between said valve stem lower portion, said valve assembly, and said metal diaphragm assembly, said valve assembly engaging an opposite side of said metal diaphragm said diaphragm stem clamp being urged into clamping engagement with said metal diaphragm assembly inner annular edge portion with said metal diaphragm assembly body portion being substantially unsupported and freely flexible between said inner and outer annular edge portions, and said metal diaphragm assembly being maintained in sealing engagement with said valve stem and said valve assembly valve stem and said valve assembly said diaphragm stem clamp being axially secured to said valve stem lower portion, said diaphragm stem clamp having a threaded axial bore for receiving said valve stem lower portion, said diaphragm stem clamp having a lower surface positioned in overlying abutting relation with said metal diaphragm assembly inner annular edge portion so that said metal diaphragm assembly is sealingly connected to said valve stem, and locking means threadably secured to said valve stem lower portion and abutting said diaphragm stem clamp for transmitting a downward axial force through said diaphragm stem clamp to said metal diaphragm assembly to maintain said metal diaphragm assembly inner annular edge position in sealing connected with said valve stem lower portion and said valve assembly to prevent fluid leakage through said metal diaphragm assembly axial bore and around said valve stem lower portion.

2. A diaphragm valve as set forth in claim 1 which includes, said diaphragm stem clamp lower surface having a convex shape, said valve assembly upper surface having a convex shape, and said convex shaped surfaces being maintained in abutting contact with said upper and lower surfaces of said metal diaphragm assembly surrounding said axial bore at said metal diaphragm inner annular edge portion to maintain a fluid tight seal around the portion of said valve stem lower portion extending through said metal diaphragm assembly while permitting said metal diaphragm assembly body portion to flex independently of said diaphragm stem clamp lower surface and said valve assembly upper surface.

3. A diaphragm valve as set forth in claim 1 in which said valve assembly includes, a disc cap portion having a first axial bore at one end portion for threadedly receiving said valve stem lower portion and a second axial bore at the opposite end portion, said disc cap portion being positioned in said chamber lower end portion, said disc cap portion having an upper convex surface for securely engaging said metal diaphragm assembly inner annular edge portion surrounding said axial bore thereof, a valve disc portion positioned in said chamber lower end portion and having a lower end portion positioned in overlying relation with said valve seat, said valve disc portion having an upper end portion including said second axial bore of said disc cap portion, said disc cap portion and said valve disc portion lower end portion each having outer annular edge portions slidable on the surface of said chamber lower end portion to maintain axial alignment of said disc cap and said valve disc in said chamber lower end portion upon longitudinal movement of said valve stem, and said valve disc portion lower end portion being movable between an open position spaced from said valve seat and a closed position in abutting and sealing relation with said valve seat upon longitudinal movement of said valve stem.

4. A diaphragm valve as set forth in claim 1 in which said valve assembly includes, a first member having an upper end portion with an upper convex shaped surface and a cylindrical portion extending axially downwardly from said upper end portion, said upper end portion being threadedly secured to said valve stem lower portion so that said metal diaphragm assembly inner annular edge portion is positioned in overlying abutting relation with said convex shaped surface and surrounding said valve stem lower portion, a second member having a cylindrical portion secured to and axially aligned with said first member cylindrical portion and a lower end portion with a lower convex shaped surface, said lower convex shaped surface being postioned in overlying relation with said valve seat and movable into and out of abutting and sealing arrangement with said valve seat, and said first member upper end portion and said second member lower end portion each having outer annular edge portions slidable on the surface of said chamber lower end portion for maintaining axial alignment of said lower convex shaped surface in said chamber lower portion for movement of said lower convex shaped surface into and out of abutting and sealing relation with said valve seat.

5. A diaphragm valve as set forth in claim 1 which includes, said valve assembly having surfaces slidably positioned on the surface of said chamber lower end portion for maintaining axial alignment of said valve assembly in said chamber lower portion to assure movement of said valve assembly into and out of abutting and sealing relation with said valve seat.

6. A diaphragm valve as set forth in claim 1 in which said valve assembly includes, a disc cap portion having an axial bore for threadedly receiving said valve stem lower portion to thereby secure said valve assembly to said valve stem, an annular portion of said disc cap portion positioned in slidable abutting relation with said valve body in said chamber lower portion, and said annular portion being operable to maintain movement of said valve assembly along an axial path in said chamber lower portion so that said valve assembly moves into and out of abutting and sealing engagement with said valve seat.

7. A diaphragm valve as set forth in claim 1 which includes, said diaphragm stem clamp body portion having an upper end portion and a convex lower end portion arranged to abut said metal diaphragm assembly, and said convex lower end portion having an annular clamping seal edge surrounding said axial bore and maintained in contact with said metal diaphragm assembly to assure sealing engagement of said metal diaphragm assembly inner annular edge portion with said valve stem lower portion.

8. A diaphragm valve as set forth in claim 7 which includes, said annular clamping seal edge of said diaphragm stem clamp extending radially outwardly from said axial bore to provide an inner annular edge adjacent said axial bore and an outer annular edge spaced radially from said inner annular edge to form an annular flat surface of a preselected width on said diaphragm stem clamp convex lower end portion, and said annular flat surface being maintained in abutting relation with said metal diaphragm assembly inner annular edge portion to generate sufficient force upon said metal diaphragm assembly adjacent to said valve stem lower portion and thereby provide a fluid tight seal between said inner annular edge portion and said valve stem lower portion.

9. A diaphragm valve as set forth in claim 1 which includes, guide means for maintaining axial alignment of said valve stem within said bonnet passageway.

10. A diaphragm valve as set forth in claim 9 in which said guide means includes, a shoulder portion extending radially outwardly from said valve stem, said shoulder portion being positioned between said upper portion and said lower portion of said valve stem, and said shoulder portion being slidable within said bonnet passageway and operable to maintain axial alignment of said valve stem lower portion within said chamber lower portion as said valve stem reciprocates within said chamber of said valve body.

* * * * *